United States Patent [19]

Hashimoto

[11] Patent Number: 4,734,929
[45] Date of Patent: Mar. 29, 1988

[54] TELEPHONE ANSWERING MACHINES FOR COLLECT CALL

[75] Inventor: Kazuo Hashimoto, Tokyo, Japan

[73] Assignee: Hashimoto Corporation, Japan

[21] Appl. No.: 759,276

[22] Filed: Jul. 26, 1985

[51] Int. Cl.$^4$ .............................................. H04M 1/65
[52] U.S. Cl. ....................................... 379/81; 379/74; 379/80
[58] Field of Search .................. 179/6.07, 6.14, 6.15, 179/6.03, 6.11; 360/74.4

[56] References Cited

U.S. PATENT DOCUMENTS

3,865,986  2/1975  Darwood ............................. 379/80
4,122,306  10/1978  Friedman et al. .................... 379/81
4,301,482  11/1981  Trevithick ........................ 360/74.4
4,514,593  4/1985  Hattori et al. .................... 179/6.07

Primary Examiner—Raymond F. Cardillo
Assistant Examiner—James E. Tomassini
Attorney, Agent, or Firm—Lowe, Price LeBlanc, Becker & Shur

[57] ABSTRACT

An automatic telephone answering device includes a generator for a voice synthesized acceptance message for collect calls. The acceptance message is generated in one of several modes of operation of the answering device, selected by a user. Preferably, the acceptance message is generated only in a fixed time message receiving mode.

6 Claims, 7 Drawing Figures

TELEPHONE ANSWERING MACHINES FOR COLLECT CALL

TECHNICAL FIELD

This invention relates to an automatic telephone answering machines, and more particularly to telephone answering and recording used for accepting collect calls.

BACKGROUND ART

According to a telephone answering machine in the prior art, a conventional and normal response message has been sent in response to an incoming call, for example "This is 421-2266 Hashimoto Corporation but unfortunately the officer in charge is absent. However, would you speak and record your message after beep tone? Thank you." More recently, however, various calling systems have been established including collect calls, credit card calls, etc. In particular, collect calls and credit card calls employ a charging system in which a calling party is not connected unless the called party agrees to pay the charge. Thus, even if an automatic telephone answering machine responds at that time, a telephone operator normally refuses to connect the line unless the answering machine contains an acceptance term. If the answering message were simply to include a message accepting a collect call or a credit card call, e.g., a simple message "collect call OK" inserted between normal answering messages, a telephone operator could connect the incoming call to the telephone answering machine. Such a provision will make the use of answering machines much more widespread. However, it should be noted that, if a collect call is automatically accepted, nuisance calls or other unnecessary calls might often result in an increased burden of telephone charges against the subscriber.

There is thus a need in the prior art to provide a telephone answering machine capable of selectively accepting collect calls under controlled conditions.

DISCLOSURE OF INVENTION

It is accordingly an object of the present invention to overcome the difficulties of the prior art and to provide telephone machines capable of accepting collect calls under conditions controlled by the user.

Therefore, according to the principle of this invention, a message such as "This is 421-2266 Hashimoto Corporation. Collect Call OK" is inserted only in one mode of operation. Specifically, the accepting message for collect calls is inserted in a fixed timer message accepting mode, selected by the user from among several other modes of accepting incoming message e.g., continuous voice operation (VOX), momentary hang-up and their combinations. In the other modes, the message "collect call OK" is not included in normal answering messages so that only when a selection switch, such as a slide switch, is set to the fixed timer mode a message "collect call OK" is automatically voice synthesized by a conventional voice synthesizer and inserted in a normal answering message. Therefore, when the mode is changed from the fixed timer to a normal VOX timer, it will be more convenient for a user that the user can set up the message "Collect call OK" only when total recording time is limited.

BEST MODE FOR CARRYING OUT THE INVENTION

Based on the foregoing concept of electronic technology, the present invention provides the following structure and effect, the details of which are described below.

Figure 1:
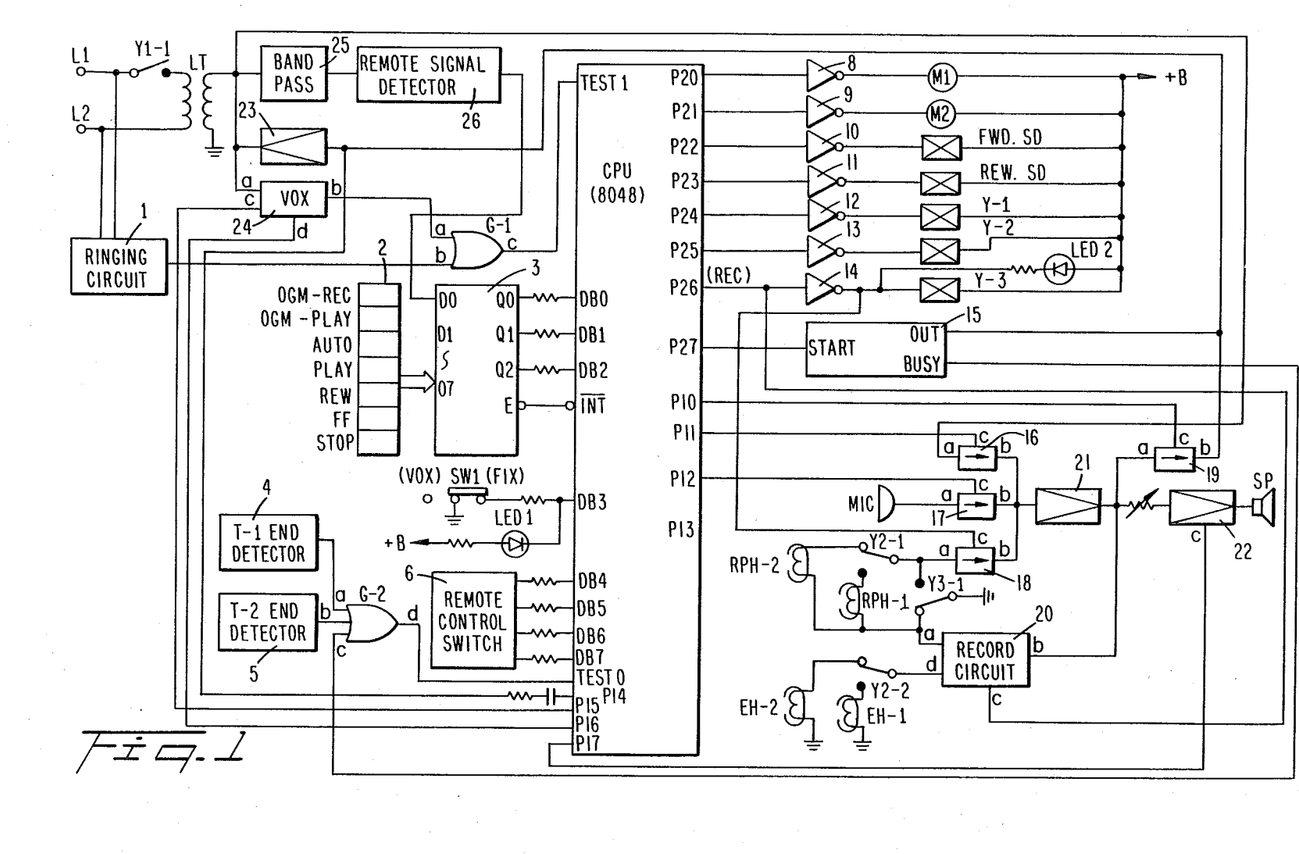
FIG. 1 is a circuit diagram showing an embodiment according to the present invention.

Referring to FIG. 1, L1, L2 represent a telephone line, LT is a line transformer, 1 comprises a ringing circuit for detecting calling signal and 2 is a keyboard equipped with various operating keys. For example, (OGM-REC) is a key for recording an answering, or outgoing, message on an answering tape T-1 (not illustrated). (AUTO) is a key for setting this device to an automatic answering and recording mode. (STOP) is a key for stopping the driving of the outgoing answering tape T-1 or an incoming message (receiving) tape T-2 (not illustrated). Furthermore, 3 is a decoder which converts the output from the foregoing keyboard to a binary number. The CPU is a 1-chip microprocessor which, in the present embodiment, may comprise an Intel 8048 (8748). Data buses DB0–DB7 are used as input ports and P10–P17 and P20–27 are used as output ports. 4 is a T-1 end detector which detects 1 cycle of the outgoing endless answering tape T-1, 5 shows a T-2 end detector for detecting the end (or starting point) of a limited length incoming message receiving tape T-2. 6 is a remote control signal cord setting digital switch to be described later. Switch SW1 can function, when the present device records the message from a calling party onto the incoming message tape T-2, to limit recording time at say a maximum of 30 seconds (FIX) or to record so long as the voice from the calling party continues (VOX). Switch SW1 provides programmed status information (FIX or VOX) via input terminal DB3 of said CPU and, when set to FIX, changes said DB3 to the output port while illuminating a light emitting diode LED1 and displaying "Collect call OK", to be described later. 8 to 14 show driver circuits comprising a transistor array. M1, driven via said driver circuit 8, is a driving motor for said outgoing message tape T-1. M2 is a driving motor for the incoming message tape T-2. According to the principle of a mechanism employed in the present device, said DC motor M2 quickly feeds tape T-2 in its single operation. When said motor M2 and a solenoid REW-SD are operated simultaneously, the incoming message tape T-2 is rewound. When said motor M2 and a solenoid FWD-SD are energized simultaneously incoming message tape T-2 is fed normally. Y-1 is a relay for a loop circuit of the telephone line and Y-2 is a relay for changing over a head connected to amplifier circuit 21 from RPH-2 (record/playback head 2 for the tape T-2) to RPH-1 (record/playback head 1 for the tape T-1). Y-2 also switches the erasing head connection from EH-2 to EH-1 during recording. 15 represents a voice synthesizing circuit which generates a synthesized voice output message "Collect call OK" at output terminal OUT when a single shot pulse is applied to the START terminal. As long as this output is present, the BUSY terminal outputs a "1". 16–19 comprise analog switches in which terminals a–b become conducting when the signal at terminal c is "1". 20 is a recording circuit. Other circuits connected between terminals a–b include a constant current circuit known in the prior art, a high frequency bias circuit for applying a high frequency bias to terminal c when terminal c becomes "1", also known in the art, a circuit for supplying erasing current to terminal d and so on. Circuits 21–23 are amplifiers, in which amplifier 22 is activated by a "1" level at terminal c, while unabling to monitor from speaker SP. Circuit 24 is a known VOX circuit which is activated by a "1" on terminal c. With terminal d on "0", its sensitivity is so low that it can only detect a non-recording tone in about 3 seconds between the first half (the answer only message part of T-1, described later) of a high level answering message and the second half thereof (recording actuating message part), and a beep tone recorded at the trailing end of said second half. With said terminal d on "1", the sensitivity of amplifier 24 increased to be so high that, as detailed later, low-level voice is discriminated from a busy tone, dial tone, silence, etc., when recording a message from a calling party. Circuit 25 is a band pass filter which passes a frequency corresponding to a remote control signal. Circuit 26 is a remote control signal detector circuit the output from which is applied to terminal D0 of said decoder 3 for interrupting said CPU.

The device of the present invention comprises said parts as described above. The following paragraphs describe more practically its effect and action referring to the related flowcharts. The flowchart of FIG. 2 should be referred to for understanding a recording process of answering messages in the answering tape T-1 (not illustrated). Said answering tape T-1 stores an answering only message in its first half, a non-recorded portion of about 3 seconds and a speech requesting message in its latter half, in that order, and a beep tone of about 3 seconds at the trailing end of said messages. Referring to FIG. 1, when the OGM-REC key on the keyboard is pushed on, relevant codes, say "Q0, Q1, Q2=1, 0, 0", are generated as binary outputs from output terminals Q0, Q1 and Q2 of decoder 3 and applied to data bus terminals DB0, DB1 and DB2 of the CPU. At the same time, terminal E of said decoder 3 becomes "0" while interrupting via interrupt terminal INT of the CPU. After testing said codes, program control proceeds with step 100 of FIG. 2, although details of the process are omitted in the flowchart. In step 100, output port P17 of the CPU is maintained at "0" to deactivate amplifier circuit 22, thereby preventing howling between speaker SP and microphone MIC to be described later. Next, in step 101, output port P20 is set to "1" to drive motor M1 via driver circuit 8 for starting up answering tape T-1 from its beginning point. The, in step 102, P25 is turned to "1" to switch on relay Y-2 through driver circuit 13. By means of its contact point Y2-1, RPH-1 is connected as the record/play head for answering tape T-1. Also, EH-1 is connected as the erase head for said answering tape T-1 by means of contact point Y2-2. In step 103, output port P-26 is set to "1" to turn ON relay Y-3 via driver 14. As a result, said head is changed to recording status by means of contact point Y3-1. In addition, recording circuit 20 is directly turned on by the output from said output port P26, thereby setting up answering tape T-1 to recording status as understood from the foregoing description. In the next step 104, analog switch 17 is turned ON by the output from output port P12 so that, by speaking the answering only message "This is 421-2266 Hashimoto Corporation, but personnel in charge is now absent—". into microphone MIC, this message is recorded in the first half of answering tape T-1. When this message is completely recorded, the STOP key should be immediately pushed on and released, thereby flow proceeds from step 105 to step 106. In step 106, said output port P12 is reset to "0". Therefore, microphone MIC is turned OFF as described before, so that answering tape T-1 continues to run in a non-recording status. In the next step 107, a test is performed to check whether said non-recording status has or has not continued for 3 seconds. This "3 seconds" period is generated by using an 8-bit timer "T" housed in the present CPU or by setting an initial value in 3–4 registers out of 16 housed in the CPU and then repeating a decrement instruction. When said 3 seconds have passed, control proceeds with step 108 where said output port P20 is set up to "0", thus turning OFF motor M1 to stop the running of answering tape T-1.

Figure 2:
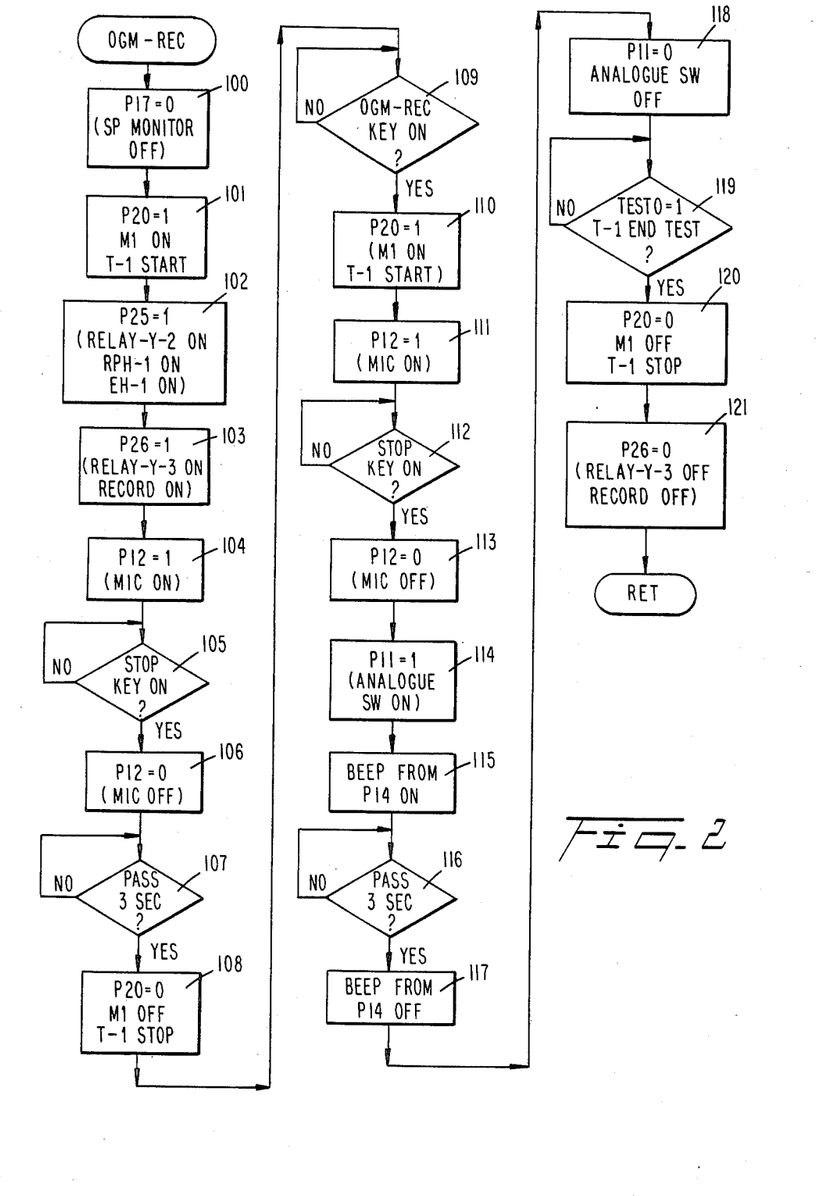
FIG. 2 shows a flowchart for recording a message to answering tape.

Consequently, a non-recorded part of 3 seconds is automatically created after said answering only message. When the running of ansering tape T-1 is stopped as described above, the user again pushes on said OGM-REC key to record a speech-requesting message, for example, "Please speak your message after beeping sound". Then, flow proceeds from step 109 to step 110 where answering tape T-1 again starts and, in step 111, microphone MIC is again turned ON, at which time the user speaks said speech-requesting answering message. When said message is completely recorded, the user should again press said STOP key, thereby flow proceeds from step 112 to step 113 in which microphone MIC is turned OFF, preventing acceptance of unnecessary voice, etc. after said message. In the next step 114, output port P11 is set up to "1" to turn analog switch 16 ON. Subsequently in step 115, a beep tone generated by the program is output from output port P14. Accordingly, said beep tone is entered in said amplifier circuit 21 via amplifier circuit 23 and said analog switch 16, so that the recording of said beep tone is begun after said speech requesting answering message. In the next step 116, a test is performed to check whether said beep tone was recorded for 3 seconds. After successfully passing the 3 seconds test, control proceeds with step 117 in which the transmission of said beep tone is turned OFF. In the next step 118, said analog switch 16 is turned OFF to complete the recording of said beep tone. Next, in step 119, an end test is performed on the answering tape T-1. According to the embodiment, the end of the answering tape T-1 is detected by means of optical reflection at the position of a metal foil attached to the end (start point). At the end, terminal TEST 0 becomes "1". Meanwhile, when answering tape T-1 reaches the end, flow moves to step 120 where the running of answering tape T-1 is stopped. In step 121, the recording circuit is deactivated, exiting from this routine.

In order to confirm a recorded answering message, the user may only press the OGM-PLAY key as described above, the detail of which is omitted herein, however. When the automatic answering and recording mode (AUTO) is set up, said answering message can be checked for replay to be described in the following.

Figure 3A:
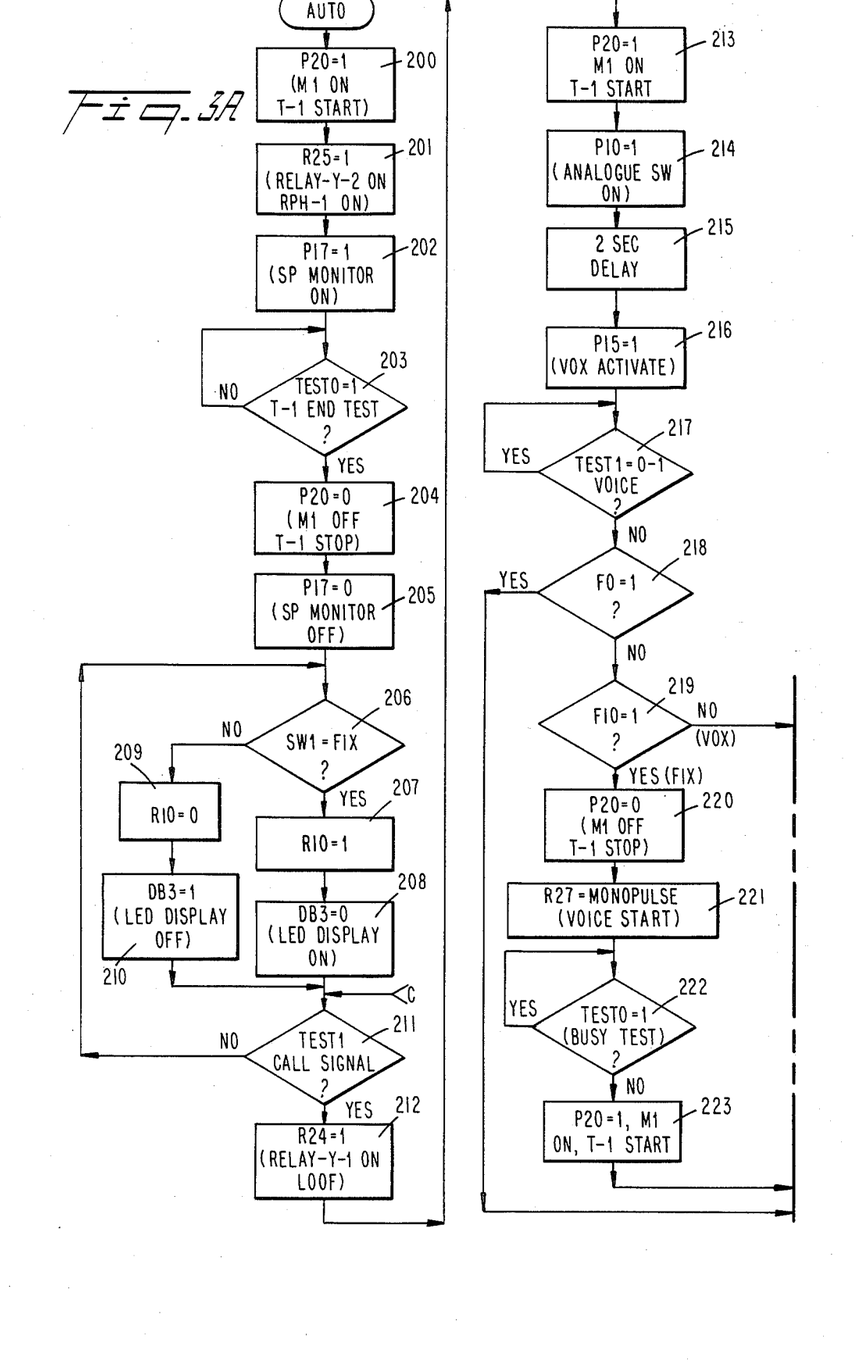
FIGS. 3A 3B and 4 show flowcharts for the invention when set to automatic answer recording position.
Figure 3B:
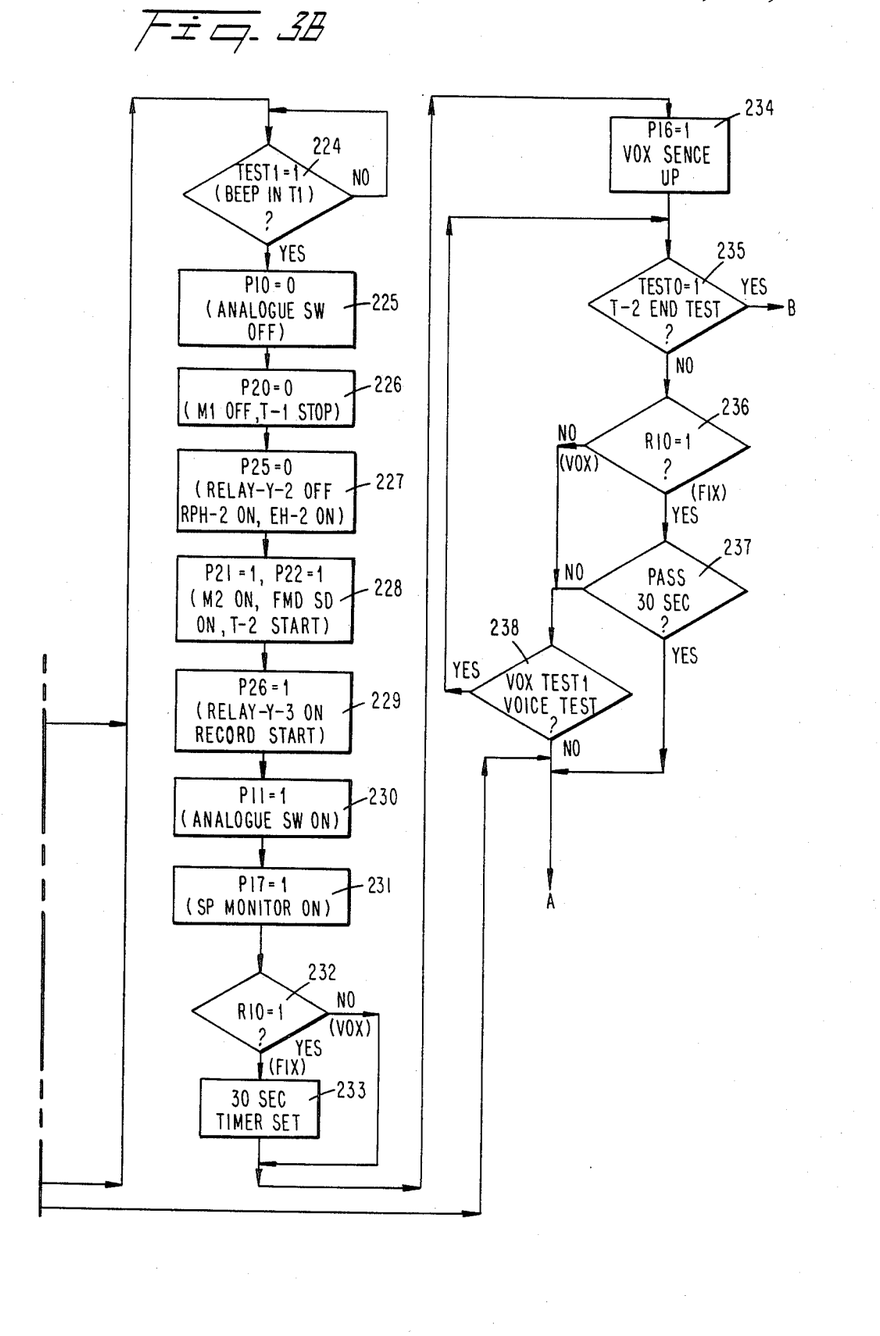
Figures 4, 6:
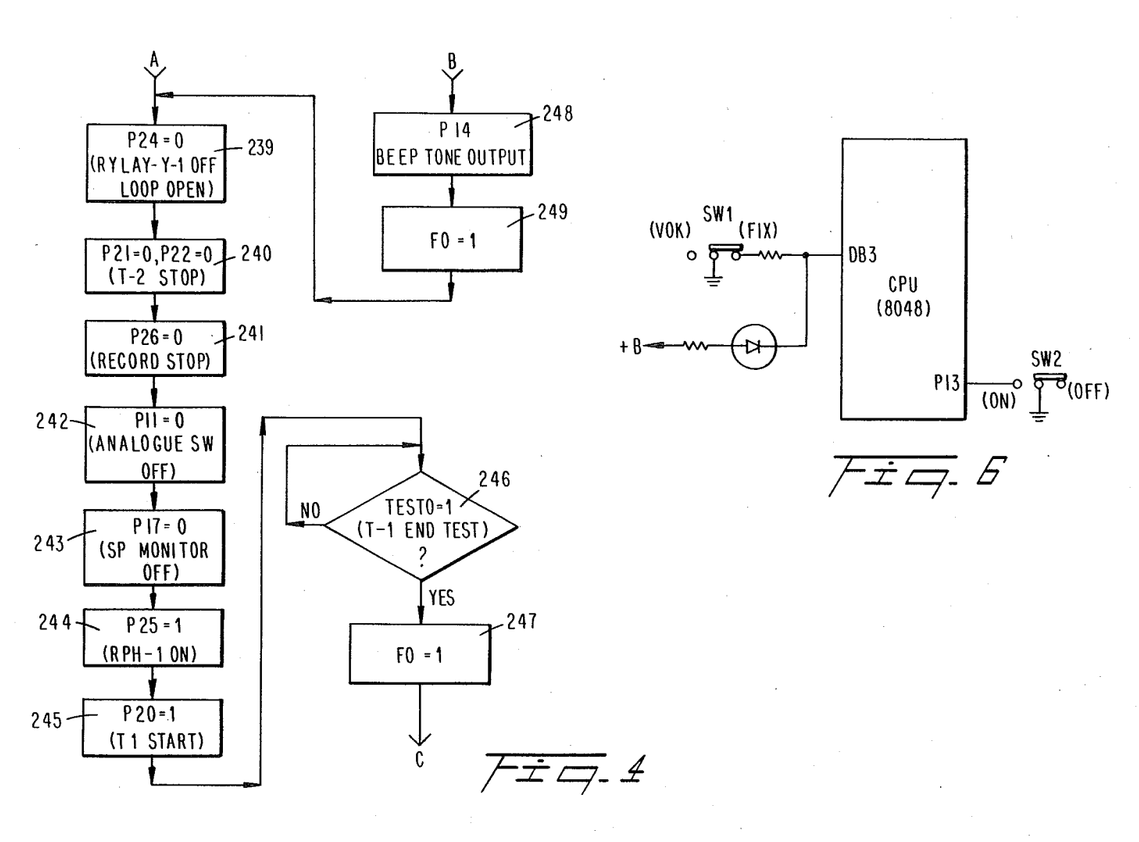
FIG. 6 shows a circuit of a major part of other embodiment.

Referring to FIGS. 3 and 4 showing a flowchart of operations, the functions of the present device are described when the AUTO mode is set up. When the AUTO key is FIG. 1 is pushed on and released, the program moves to step 200 in FIG. 3. Then, output port P20 is set to "1" while starting answering tape T-1 as previously described. In the next step 201, the recording/replaying head is switched to RPH-1 for answering tape T-1 as described above. In step 202, the output port P17 is turned to "1" to activate amplifier circuit 22, thereby starting to monitor with speaker SP. Consequently, the recorded answering message can be monitored as described before. In the following step 203, the end test is performed for answering tape T-1. When it reaches the end, answering tape T-1 is stopped as shown in steps 204 and 205 so that the monitoring from speaker SP is deactivated.

When answering tape T-1 is stopped as described above, control flow moves to step 206 and a test is performed to check the position to which said VOX/FIX changeover switch SW1 is set up. When the setting is to the FIX side of the fixed timer, control flow proceeds with step 207 in which the 0th bit of a register R1 stored in the CPU, for example, namely R10, is set to "1" as a flag, for a corresponding conditional jump to be described later. Next in step 208, data bus terminal DB3 is set to "0" to turn ON the light emitting diode LED 1 for displaying collect call OK". Thereafter, control moves to step 211. When said switch SW1 is changed over to the VOX side, on the other hand, control moves from said step 206 to step 209 in which said register R10 is set to "0". In step 210, said light emitting diode LED 1 is turned OFF and control proceeds with step 211.

Said step 211 is called the ready mode in which incoming of a calling signal is tested through terminal TEST 1. When a calling signal arrives, control moves to step 212 where output port P24 is set to "1", thereby turning ON loop relay Y-1 via driver 12. Its contact point Y1-1 places telephone lines L1, L2 in a loop so that the calling signal is stopped, resulting in a loop mode. In the next step 213, answering tape T-1 is started and, in step 214, output port P10 is set to "1" and analog swtich 19 is turned ON. As a result, the answering message is sent to the telephone line through recording/replaying head RPH-1, analog switch 18, amplifier circuit 21, analog switch 19, amplifier circuit 23 and line transformer LT. Step 215 delays operation by about 2 seconds (to match a non-recorded portion due to a metal foil and leader tape), then in step 216, output port P15 is set to "1" thereby activating VOX circuit 24. The next step 217 tests whether the answering message play back through terminal TEST 1 is continuously incoming, through said VOX circuit. When said terminal TEST 1 repeats "1" and "0" in 3 seconds, the answering message is considered to be played back. When TEST 1 maintains a "0" for 3 seconds, the tape is considered to be at a non-recorded portion following said answering only message. When this non-recorded portion is detected, control flow moves to step 218. In this step 218, flag F0 is tested, said flag being set to "1" when incoming tape T-2, to be described later, reaches the end. At this time, however, incoming tape T-2 has not reached the end so that flow proceeds with step 219. In step 219, a test is performed which determines if switch SW1 was set to the FIX or VOX side in the foregoing step 206. side. Where set to the FIX side, register R10 is at "1" so that control moves to step 220. This step 220 stops the running of answering tape T-1. Subsequently in step 221, one shot pulse is generated from output port P27 while starting voice synthesizing circuit 15 to output the message "Collect call OK" from output terminal OUT and transmitting the message onto the telephone line through amplifier circuit 23 and line transformer LT. In the next step 222, the BUSY output of said voice synthesizing circuit 15 is tested through terminal TEST 0 and OR gate G-2. When the message "Collect call OK" is completed said terminal TEST 0 is turned to "0", then flow moves to step 223. In this step, answering tape T-1 is restarted after a temporary stop of running as described above. Therefore, the answering message requesting speech is sent onto the telephone line, which message was recorded in the latter half of T-1 as described before. The next step 224 detects beep tone recorded after said speech-requesting answering message. When terminal TEST 1 maintains a "1" level continuously for approximately 1 second, this is regarded as a beep tone, and control moves to step 225. In this step, output port P10 is set to "0" while along switch 19 is turned off so that sound from answering tape T-1 is no longer transmitted onto the telephone line. In the following step 226, the running of answering tape T-1 is stopped. In step 227, said relay Y-2 is turned OFF while switching the record/playback head from that used for the answering tape to RPH-2 and EH-2 for the incoming tape. Next in step 228, output ports P21 and P22 are set to "1" to turn ON motor M2 and solenoid FWD-SD while starting message tape T-2 in normal forward direction. In step 229, the recording circuit is activated as described above so that said incoming message tape T-2 (not shown) is switched to the recording status. In addition, output port P11 is set to "1" in the next step 230, turning analog switch 16 ON. Therefore, the message from a calling party is recorded on incoming message tape T-2 through line transformer LT, analog switch 16, amplifier circuit 21, recording circuit 20 and recording/replaying head RPH-2. In the next step 231, monitoring from speaker SP is enabled as previously described. In the next step 232, register R10 is tested as in said step 219. At this time the FIX side is set up, so that control flows to step 233 wherein a fixed timer for FIX, say 30 seconds, is set up. In the next step 234, output port P16 is set to "1" to increase the sensitivity of VOX circuit 24. This is intended to prevent the waste receiving tape even when a fixed timer of 30 seconds is set up, in which the present device is returned to the ready condition if a calling party hangs up before 30 seconds. The reason for increased sensitivity is that the voice level from a calling party is much lower than the level of voice regenerated from the answering tape. Next in step 236, an end test is performed for receiving tape T-2 through terminal TEST 0 and, when the receiving tape T-2 arrives at the end (to be described later), control moves to step 248 via the arrow marked B. When T-2 is not at the end, as in the present case, control moves to step 236 in which register R10 is again tested as described above. At that time, switch SW1 is set to the FIX side so that control flows to step 237. When a limit of 30 seconds is not passed, control moves to step 238 wherein the output of said VOX circuit 24 is tested to determine whether or not a voice sound from a calling party is entered through terminal TEST 1. Then, control returns to said step 235 and these operations are repeated. When a limit of 30 seconds passes or a voice sound from calling party is interrupted longer than a predetermined time, control flows to step 239 through the arrow marked A. In this step, output port P24 is set to "0" to turn OFF loop relay Y-1 while opening the loop. In steps 240 to 243, the running of receiving tape T-2 is stopped while deactivating the recording condition. Answering tape T-1, being stopped at a beep tone position as described above, is again started in step 245. When the end of T-1 is detected in step 246, control returns to the ready mode in step 211 from step 247 (to be described later) through the arrow marked C.

By repeating the foregoing operations, messages from calling parties are stored in tape T-2.

Next, when said switch SW1 is changed over to the VOX position, flow moves from said step 206 to step 209 in which the 0th bit of said register R1, namely R10, is set to "0". In the next step 210, LED1 for displaying "collect call OK" is turned OFF and then control returns to the ready mode of step 211. Consequently, when a call arrives, the following operations take place, the steps being described briefly because of duplications of the foregoing description. A loop is formed with steps 212 to 216 while sending the answering only message stored in the first half of answering tape T-1. Then, the non-recorded part is detected in step 217 and said register R10 is tested in step 219 after passing through step 218. At this time, switch SW1 is set to the VOX side so that flow moves from step 219 directly to step 224, without passing through the flow chart position for voice synthesis of "Collect call OK". Therefore, answering tape T-1 runs continuously resulting in transmitting the speech-requesting message after a 3-second non-recorded part following an answering only message. Further, in steps 232 an 236, control does not pass through the FIX timer flow portion so that, when a voice sound from a calling party is entered, the incoming message receiving tape T-2 keeps running regardless of time.

On the other hand, when the device is set up to FIX side, message from a calling party is not recorded if the receiving tape T-2 reaches the end. Therefore, even if said synthesized voice message "Collect call OK" is sent, the message is meaningless so that its sending is prevented. More explicitly, when receiving tape T-2 reaches the end, control flows to step 248 from step 235 through arrow B, while a beep tone is generated in step 248, then flag F0 is set to "1" in step 249 and reset. At the time of the next incoming call, therefore, control moves to resetting operation to step 239 from said step 218 through arrow A, so that the device is reset after completion of sending the answering only message.

Even where said switch SW1 is set up to either one of the FIX or VOX side, this device can send or release the synthesized voice message "Collect call OK" by setting said register R10 to "1" or by resetting to "0" by flip-flop and repeating these operations. This device employs 3 types of remote control signals; the first is a remote control signal for common use of remote controlled listening open and resetting (f0), the second is a remote control signal for a back space (f1) and the third is a remote control signal for a collect call OK (f2). All these signals are coded.

Said remote control signal f0 is sent when the message of said answering tape T-1 is being transmitted. This remote control signal L0 interrupts the CPU through line transformer LT, bandpass filter 25, remote control signal detector circuit 26 and decoder 3, thereby causing the program to flow to step 300 of FIG. 5. In step 300, flag F1 stored in the CPU is tested. When power is switched on, F1 was cleared so that as a result of the present test flow moves to step 301 where the code of digital switch 6 is entered through data buses DB4–DB7. In the next step 302, a test is performed to determine whether said remote control signal F0 identifies with code as set forth by said digital switch. If the signal an code agree, said flag F1 is set to "1" in step 303. Next in 304, another test is performed to determine whether remote control signal f0 is or is not input. When the sending of remote control signal f0 is released, flow moves to step 305 in which a 3-second delay is applied. If the device is left free, control proceeds with step 306 after the passing of said 3 seconds, and then receiving tape T-2 (not shown) is rewound and replayed. The details of the rewinding are omitted herein because of having no direct relations to the present invention.

Figure 5:
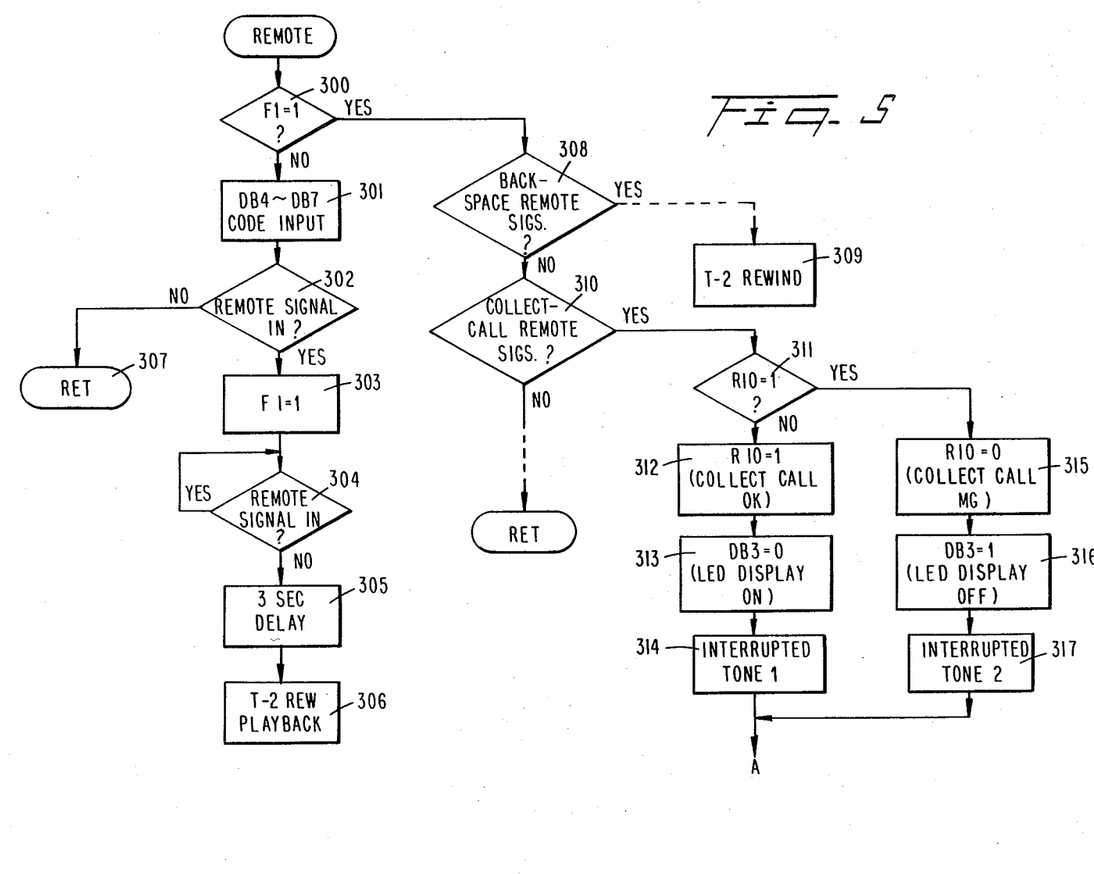
FIG. 5 is a flowchart for remote control operation.

On the other hand, sending/releasing of synthesized voice "Collect call OK" is sometimes required, not remote controlled listening of receiving tape T-2. In this case, the device outputs the remote control signal f2 for a collect call during the the 3 second delay in the foregoing step 305. According to interruption of the CPU by this remote control signal f2, the program flows to step 308 from step 300 (because flag F1 is set to "1" in advance in said step 303). In step 308, the code does not coincide. Accordingly, the program flows to the next step 310. The code is accepted here and the program flows to step 311 and the foregoing register R10 is tested for discrimination of "1" or "0". When R10 is "0", the program flows to step 312. Said register R10 is set to "1" here. The light emitting diode LED 1 for indicating collect call OK is lighted up in step 313 and in the next step 314, an intermittent tone (different from that of step 317) is sent to the remote control operator to indicate that change of collect call OK is over. With the following remote control signal f2, the program flows to step 315 from step 311. If the telephone is hung up when collect call OK changing is completed, program flows to step 239 shown in FIG. 4 via arrow A. Thus, control moves to the resetting operation and the device enters a ready mode after heading of answering tape T-1 is completed.

FIG. 6 is a circuit diagram showing only a major part of another embodiment. Switch SW2 for setting collect call OK is newly provided in the present diagram. The selection switch SW1 for VOX or FIX has no relation to the switch for setting collect call. Accordingly, setting/releasing of collect call OK can be independently performed by said switch SW2, regardless of the set position of said switch SW1, i.e., to the VOX or FIX side. A flowchart is not shown; however, port P13 is used for input. The flowchart can easily be corrected, e.g., by setting said register R10 to "1" if P13 is set to "1" and to "0" if P13 is set to "0".

In the above embodiment, the message of collect call acceptance or the like is inserted between a first outgoing message and a second outgoing message, but sometimes it is convenient for a general operator of the telephone company to hear this message immediately, before the beginning of the recorded outgoing message. It is possible to change the flow chart and program of the CPU for the above purpose. Also in the above embodiment, the message means a collect call or a credit card call is acceptable. But the message is not limited to the above speech. In the future, many cases similar to the above requirement will occur in telecommunication and will require a special service from a telephone company or from a called party. Thus, the special message or answer will be necessary during answering by automatic answering devices. It is within the spirit of the present invention to meet the above need.

Up to date, a telephone operator does not typically connect a collect call or a credit card call to an existing telephone answering machine. However, with the present invention, a collect call can be received only when the collect call OK" message is transmitted and a fixed timer or the like is used. Thus the future practical use of the telephone answering machine has been increased by the present invention.

What is claimed is:

1. A method of operating an automatic telephone answering and recording device for accepting a collect call, the device having a mode selection switch for selection between a conventional telephone answering mode in which the length of the caller's message is not limited and a fixed time/charge hangup mode for accepting collect calls in which the caller is only allowed a fixed amount of time/charge to deliver a message, comprising the steps of:

upon selection by the selection switch of the conventional telephone answering mode, sending a conventional telephone answering message on the telephone lines to a caller upon receipt of an incoming call; and upon selection by the selection switch of the fixed time/charge hangup mode, sending a collect call acceptance message on the telephone lines to the operator upon receipt of an incoming call, then upon connection between the caller and called party by the operator, sending the conventional telephone answering message to the caller, and automatically hanging up upon passage of a fixed period of time for recording the caller's voice.

2. The method of claim 1, including the step of selecting between the conventional telephone answering mode and the fixed time hangup mode by remote control over the telephone lines.

3. The method of claim 1, wherein the conventional telephone answering message comprises first and second message portions prerecorded on a recording medium, said first and second message portions separated from each other on said medium by a non-recorded gap having a predetermined duration (e.g., three seconds), said method including, during the fixed time hangup mode, the additional step of sending the collect call acceptance message during a time interval corresponding to the duration of said non-recorded gap.

4. In an automatic telephone answering and recording device having means for receiving an incoming telephone call and forming a telephone loop circuit, a first recording medium for storing prerecorded outgoing messages and a second recording medium for recording incoming messages from a caller, means for accepting collect calls, comprising:

a mode in which the length of the caller's message is not limited selection switch for selection between a conventional telephone answering mode and a fixed time/charge hangup mode for accepting collect calls in which the caller is only allowed a fixed amount of time/charge to deliver a message;

means responsive to a conventional telephone answering mode selection by said switch for sending a conventional telephone answering message on the telephone lines to a caller upon receipt of an incoming call; and means responsive to the fixed time/charge hangup mode selection by said switch for (1) sending a collect call acceptance message on the telephone lines to the operator upon receipt of an incoming call, (2) sending the conventional telephone answering message to the caller upon connection between the caller and called party by the operator and (3) automatically hanging up upon passage of a fixed period of time for recording the caller's voice.

5. The device of claim 4, wherein the conventional telephone answering message comprises first and second message portions prerecorded on a recording medium, said first and second message portions separated from each other on said medium by a non-recorded gap having a predetermined duration (e.g., three seconds), said device further comprising means operative during the fixed time hangup mode for sending the telephone call acceptance message during a time interval corresponding to the duration of said non-recorded gap.

6. The device of claim 4, wherein send means for sending said collect call acceptance message comprises a voice synthesizer means.

* * * * *